United States Patent [19]
Yamamoto et al.

[11] Patent Number: 5,650,889
[45] Date of Patent: Jul. 22, 1997

[54] MAGNETIC RECORDING MEDIUM CONTAINING HEAVY RARE GAS ATOMS, AND A MAGNETIC TRANSDUCING SYSTEM USING THE MEDIUM

[75] Inventors: Tomoo Yamamoto, Hachiouji; Yuzuru Hosoe, Hino; Emi Mangyo, Kokubunji; Masaaki Futamoto, Shiroyamacho; Nobuyuki Inaba, Hasuda, all of Japan

[73] Assignee: Hitachi, Ltd., Tokyo, Japan

[21] Appl. No.: 380,792

[22] Filed: Jan. 30, 1995

[30] Foreign Application Priority Data

Feb. 7, 1994 [JP] Japan ................................. 6-013329
Mar. 18, 1994 [JP] Japan ................................. 6-049090

[51] Int. Cl.$^6$ ............................... G11B 5/012; G11B 5/82
[52] U.S. Cl. ........................................ 360/97.01; 360/135
[58] Field of Search ..................... 360/97.01, 131–136

[56] References Cited

U.S. PATENT DOCUMENTS

| | | | |
|---|---|---|---|
| 4,410,406 | 10/1983 | Kohmoto | 204/192 M |
| 4,726,988 | 2/1988 | Oka | 428/307.3 |
| 4,735,840 | 4/1988 | Hedgcoth | 428/65 |
| 5,124,856 | 6/1992 | Brown | 360/97.02 |
| 5,434,014 | 7/1995 | Kanamaru | 428/694 T |

OTHER PUBLICATIONS

N. Tani et al, "Increase of Coercive Force in Sputtered Hard Disk", IEEE Transactions on Magnetics, vol. 26, No. 4, Jul. 1990, pp. 1282–1285.

H. Murata et al, "Magnetic Properties and Microstructure of CoCrTa/Cr Magnetic Recording Media", Journal of the Japan Applied Magnetics Society, vol. 16, 1992, pp. 541–546.

Y. Deng et al, "Structural Characteristics of Bias Sputtered CoCrTa/Cr Films", Digest of Intermag Conference, Apr. 13–16, 1993, p. EB–04.

H. Yoshimoto et al, "Recording Characteristics of Co–Cr–Ta Perpendicular Magnetic Recording Tape a Short Wavelength", Journal of the Japan Applied Magnetics Society, vol. 17, supplement, No. S2, 1993, pp. 125–130.

*Primary Examiner*—A. J. Heinz
*Attorney, Agent, or Firm*—Fay, Sharpe, Beall, Fagan, Minnich & McKee

[57] ABSTRACT

A magnetic recording medium having a high coercivity and a high S/N ratio for high-density operation can include either a conductive or a nonconductive substrate. If the substrate is nonconductive, a conducting precoat layer is formed over the substrate. Further, an underlayer may be provided, over which a magnetic layer is formed by a bias sputtering method. The bias sputtering method may use Kr, Xe or Rn as a sputter gas, and employs a negative bias voltage. The magnetic recording medium has a product of remanent magnetization and magnetic layer thickness of 10–150 G·μm and a coercivity of 1600–4000 Oe. In combination with this magnetic recording medium, a large-capacity magnetic recording system has a write head that uses a magnetic material having a saturation magnetic flux density of more than 1.2 T in at least a part of the magnetic core; a read head utilizing the giant magnetoresistance effect; a signal processing circuit that utilizes maximum likelihood decoding; and circuits that correct for asymmetry of the reproduced signals from the magnetoresistive head. In addition, the flying height of the magnetic head slider is set to less than 0.05 μm.

27 Claims, 16 Drawing Sheets

MAGNETIC RECORDING MEDIUM CONTAINING HEAVY RARE GAS ATOMS, AND A MAGNETIC TRANSDUCING SYSTEM USING THE MEDIUM

BACKGROUND OF THE INVENTION

1. Field of the Invention

The present invention relates to magnetic recording media, such as magnetic drums, magnetic tapes, magnetic disks and magnetic cards, and to a magnetic recording system. More specifically, the invention relates to a thin-film magnetic recording medium suited for ultra-high density magnetic recording, and to a magnetic recording system using such a magnetic recording medium.

2. Description of the Related Art

Remarkable advances in computers and information processing systems in recent years have made society increasingly information-oriented, and the amount of information handled by individuals is on the steady rise. As a result, there are growing demands for increased storage capacity and high-speed access of external storage devices of information processing systems. In particular, magnetic disk apparatuses—external storage devices suited for high-density recording—are under great demand for increased speed and capacity and reduced size.

Among the magnetic recording media used with a magnetic disk apparatus are a coated magnetic recording medium with oxide magnetic material powder applied to a substrate, and a thin-film magnetic recording medium with a thin film of metallic magnetic material deposited on a substrate by vacuum evaporation or sputtering. The thin-film magnetic recording medium has a high density of magnetic material in the film being recorded as compared with the coated magnetic recording medium, and is thus suited for recording at a higher density. For this reason, most of the magnetic disk apparatuses currently being manufactured employ thin-film magnetic recording media.

The substrate of the thin-film magnetic recording medium has commonly been a Ni-P plated Al-Mg alloy. As portable small computers have become more popular and impact resistance has become an important requirement, increasing numbers of harder reinforced glass substrates, crystallized glass substrates and carbon substrates are being used.

A widely known thin-film magnetic recording medium structure consists of an underlayer, a magnetic layer and a protective layer formed in that order on the substrate. Increasing the storage capacity of the magnetic disk apparatus requires increasing the coercivity of the thin-film magnetic recording medium.

In recent years, a bias sputtering method has attracted attention as a way of increasing coercivity. This method involves applying a negative DC bias voltage to a conductive substrate when depositing the underlayer and the magnetic layer and, upon completion of deposition of these layers, introducing argon (Ar) as a sputter gas to the surface of the substrate. This method is described in the *IEEE Transaction on Magnetics*, Vol. 26, 1282 (1990), and in *Nippon Oyo Jiki Gakkaishi* (*Journal of the Japan Applied Magnetics Society*), Vol. 16 (1992), page 541. For nonconductive substrates such as reinforced glass, on the other hand, an RF bias is normally used, as described in the *Digest of Intermag. Conference*, page EB-04, held on Apr. 13–16, 1993.

*Nippon Oyo Jiki Gakkaishi*, Vol. 17 (1993), supplement, No. S2, page 125, describes a sputtering method using krypton (Kr). This method, however, does not apply a bias voltage to the substrate, and fabricates the magnetic film by ordinary sputtering.

To realize a high recording density of more than 1 gigabits per square inch, the product of remanent magnetization and magnetic layer thickness of the magnetic recording medium should be kept below 150 G.μm to reduce the magnetizing field originating from the bit boundary. In this case, the coercivity must be at least 1600 Oe, and preferably at least 2000 Oe. It is, however, difficult to meet this requirement in a film deposited by ordinary sputtering.

As mentioned above, a bias sputtering method is known which applies a negative bias voltage to the substrate when forming the underlayer and the magnetic layer. A magnetic recording medium has yet to be produced by this method, however, which has read/write characteristics that satisfy the requirements of the above-mentioned high-density recording. Nor have thorough studies been conducted on the reliability characteristics of media manufactured by bias sputtering, such as corrosion resistance.

Further, in conventional thin-film media fabricating methods, for a hard nonconductive substrate that is suitable for use in one of the new small magnetic disk drives, only the RF bias sputtering method has been adopted. With this method, however, the manufacturing facility becomes large, and at the same time the production efficiency becomes significantly low. Additionally, the media thus fabricated do not have good enough read/write characteristics to enable high-density recording.

Moreover, when the product of remanent magnetization and magnetic layer thickness of the conventional magnetic recording medium is smaller than 150 G.μm, the sensitivity of a conventional inductive head, and that of a dual head having an inductive head for writing and a magnetoresistive (MR) head for reading (simply referred to as a dual head), may not be sufficiently high for acceptable operation. It is, therefore, desirable to use a magnetic head with higher reproduction sensitivity in conjunction with a signal processing circuit that is suitable for use with the magnetic head. Further, a signal modulation/demodulation circuit suitable for high density recording should be employed.

SUMMARY OF THE INVENTION

A first objective of this invention is to use the DC bias sputtering method even when a nonconductive substrate is employed.

A second objective of this invention is to provide a magnetic recording medium that has high coercivity, good read/write characteristics for high density operation, and high reliability features such as corrosion resistance.

A third objective of the invention is to provide a large-capacity magnetic recording system that can take full advantage of the characteristics of such a magnetic recording medium.

To achieve the first objective, the present invention forms a conducting precoat layer over a nonconductive substrate, and deposits a magnetic layer directly or with an intervening nonmagnetic underlayer over the precoat layer while applying a DC bias voltage to the conducting precoat layer. At this time, the locations where the conducting layer and the substrate electrode jig are brought into contact with each other is under some constraint because the recording area information must be secured. The intermediate circumferential portion of the disk (i.e., the portion of the disk between the inner and outer circumferences), in particular, should best be used as the recording area and not as the contact portion. The innermost circumferential portion of the disk, on the other hand, is not used as a recording region even if formed with a magnetic layer because this portion is contacted by a spindle. The extreme outer circumference also is not used as a recording region because the slider of the magnetic head disengages from the disk surface at the outer circumference. Hence, the method of securing an electrical contact between the conducting layer and the substrate electrode jig should preferably offer a surface contact or point contact between them at the inner or outer circumference of the medium, or a surface or point contact on an extension of the conducting layer that overlaps the side wall surface of the medium at the inner or outer circumference.

Further, the bias is preferably applied when forming the magnetic layer, and should not be applied solely during the forming of the nonmagnetic underlayer because almost no effect is produced. The layers formed by applying a bias in this way have features such as an increased density of sputter gas and a greater interplanar spacing of the (110) plane (hexagonal).

In fabricating a magnetic recording medium having a magnetic layer deposited directly on a non-magnetic substrate or through an underlayer (i.e., with an underlayer between the substrate and the magnetic layer), and a protective layer formed over the magnetic layer, the second objective is achieved in part by adopting a bias sputtering method that uses a heavy rare gas such as krypton (Kr), xenon (Xe) or radon (Rn), or a gas mixture of one of these gases preferably at 2at % or more with argon (Ar), as a sputter gas. Preferably, the method applies a negative bias voltage to the substrate during the step of forming the magnetic layer.

The sputtering bias may be either a DC bias or an RF bias. The bias voltage should preferably fall between −400 V and −30 V and is preferably applied only during the step of sputtering the magnetic layer so that the concentration of Kr, Xe and Rn in the underlayer is lower than the concentration in the magnetic layer. Applying a bias only during the step of forming the underlayer seems to have little or no advantageous effect. Moreover, when the bias is applied when forming a protective layer over the magnetic layer, the amount of increase in the coercivity is relatively small, and reduces the corrosion resistance of the medium. Therefore, the bias is best applied only during formation of the magnetic layer.

The magnetic recording medium constructed according to the teachings of this invention thus contains more than 100 ppm of Kr, Xe or Rn in the magnetic layer, which is preferably formed of Co or a Co alloy crystal grains having a virtually hexagonal crystal structure. A (110) plane of the hexagonal crystal structure parallel to the magnetic layer surface preferably has an interplanar spacing larger than that of a (110) plane of the hexagonal system tilted more than 20 degrees from the magnetic layer surface.

In a preferred embodiment, the product of remanent magnetization and magnetic layer thickness is in the range between 10 G.μm and 150 G. μm, and the coercivity in the range between 2000 Oe and 4000 Oe.

When the substrate is a nonconductive material such as glass, a conducting precoat layer may be formed over the substrate to allow the bias voltage to be applied efficiently.

The conducting precoat layers need not be provided when a conductive substrate is used. However, because the conducting precoat layer serves as a control film for the crystal structure of the underlayer and improves the coercivity depending on the film structure and sputtering condition, it is preferred to provide the conducting precoat layer even when a conductive substrate is used.

The "magnetic layer" may be either single-layered or multilayered (i.e., comprising plural magnetic layers). When the magnetic layer is of a multilayered structure, an intermediate layer is preferably provided between the magnetic layers to reduce noise. The intermediate layer preferably has the same composition as the underlayer but may be formed as an oxide, nitride, or carbide. The intermediate layer is preferably 0.1–5 nm thick to enhance the overwrite characteristics of the medium. Moreover, rather than depositing the intermediate layer, it may be formed by repetitively stopping and then resuming the magnetic layer formation, to form the oxide, nitride, or carbide layer 0.1 nm thick or more between the magnetic layers.

The third objective is achieved by a dual head, wherein the inductive head uses a magnetic material having a saturation magnetic flux density of more than 1.2 T in at least a part of the magnetic core, and the magnetoresistive head has a giant magnetoresistive element. The read/write signal processing means that processes input and output signals to and from the magnetic head includes a signal processing circuit using partial response maximum likelihood technology, and a circuit that utilizes the giant magnetoresistance effect to correct for asymmetry of the read signal from the MR head. The flying height of a slider to which the magnetic head is fixed should preferably be less than 0.05 μm.

The coercivity of the magnetic layer is increased by the bias sputtering method for reasons that are not fully determined, but the following explanations may be offered:

(1) Sputter gas elements enter the magnetic film to induce distortions in the magnetic crystal structure. At the same time, the sputter gas elements accelerate magnetic isolation of the magnetic crystal grains, preventing interaction between the crystal grains.

(2) Because ions impinge on the substrate surface at high speeds, the effective temperature of the layer surface rises, prompting segregation of nonmagnetic elements such as Cr to the grain boundaries to enhance magnetic isolation.

(3) The growth of crystals with weak coupling is restrained, allowing selective crystal growth.

(4) The sputter gas elements clean the surface of the stacked layers, removing residual contaminations.

As a result, an effective anisotropy field and lattice distortions of the magnetic film due to the sputter gas atoms are increased, thereby enhancing the coercivity.

These features are all dependent on the energy of the sputter gas (a preferred pressure range being 1.7–2.5 mTorr), that is, the atomic weight. When at least one of Kr, Xe and Rn is used as the sputter gas, the excited state of the plasma differs from the state when Ar is used, in part because of the greater atomic weight of the heavy rare gases, thus electrically influencing the sputter particles that fly through the plasma to give them greater kinetic energy when they reach the substrate. This is considered to be a reason for the improved crystallographic properties of the deposited film. Therefore, Kr, Xe or Rn are preferably used in the sputter gas, in combination with the bias effect.

When a 100% pure gas of Kr, Xe or Rn is used as the sputter gas, however, the manufacturing cost of the medium increase with the quality of its magnetic characteristics. The cost may be lowered by using a gas mixture of Kr, Xe or Rn with Ar to reduce the amount of heavy rare gas consumed. Such a gas mixture does not impair the effect of the heavy rare gas, but still permits a recording medium with excellent magnetic characteristics to be manufactured. A heavy rare gas is preferred as the sputter gas because it enters into the magnetic film in large amounts; thus, the sputter gas should be electrically and chemically stable so as not to degrade the film.

There are two kinds of bias sputtering methods: a DC bias sputtering method and an RF bias sputtering method. The DC bias sputtering method has been primarily effective for conductive substrates, while the RF bias sputtering method has been most effective for nonconductive substrates. If, however, a conducting precoat layer is formed over a nonconductive substrate to make a secure electrical contact between the conducting precoat layer and a substrate electrode, the DC bias sputtering method can also be applied to nonconductive substrates.

It is further desirable to form an oxide layer, a nitride layer or a carbide layer with a thickness of 0.1–10 nm over the surface of this conducting precoat layer in order to improve the coercivity of the magnetic layer formed later. The thin film of the oxide layer, nitride layer or carbide a multiple magnetic layer structure made up of an underlayer, a magnetic layer, an intermediate layer, a magnetic layer, an intermediate layer, . . . , and a protective layer. In the multiple magnetic layer structure, individual magnetic layers are formed thin with an intermediate layer more than 0.1 nm thick interposed between the magnetic layers. This construction allows the magnetic layers to be stacked while maintaining the crystal grains in a microfine state, and also reduces the exchange interaction to such a degree that the individual layers can virtually be deemed as magnetically independent of each other. In this case, it is possible to mitigate the magnetostatic interaction between the magnetic layers and thus reduce noise according to statistical summation, realizing a further reduction in noise from the noise level when the single magnetic layer structure is used. The read output can also be enhanced by using two or more magnetic layers.

The combined use of the inventive magnetic recording medium and a dual head ensures high-quality reproduced signals, resulting in a magnetic disk apparatus having more than two times the capacity of the conventional apparatus.

The factors contributing to these improvements are explained as follows. A write head that uses a magnetic material having a saturation magnetic flux density of more than 1.2 T in at least a part of its magnetic core has a layer does not impact adversely on the subsequent application of the sputtering bias because the film is easily broken or produces a tunnel effect to secure conduction when a jig for applying the bias to the substrate is brought into contact with the recording medium.

The bias sputtering method of this invention allows the product of remanent magnetization and magnetic layer thickness to be kept below 150 G.μm while maintaining a coercivity of more than 1600 Oe (and, preferably, more than 2000 Oe). These characteristics enable the high recording density desired. When, however, the product of remanent magnetization and magnetic layer thickness is set below 10 G.μm, the influence of thermal fluctuation increases, significantly reducing the coercivity even if the bias sputtering method is employed. Furthermore, setting the product below 10 G.μm results in too small a read output and should be avoided. Similarly, a coercivity of higher than 1600 Oe (and preferably higher than 2000 Oe) produces a high read output for a high density recording, but setting the coercivity higher than 4000 Oe results in a significant degradation in the overwrite characteristics of the medium because such a high value far exceeds the write capability of the magnetic head.

In addition to a single magnetic layer structure consisting of an underlayer, a magnetic layer and a protective layer, the recording media fabricated by this method may have greater recording magnetic field than that of the conventional magnetic head, which has a saturation magnetic flux density of only about 1 T. The apparatus employing the inventive medium can thus take advantage of significant improvements in the overwrite characteristics of the medium. Furthermore, with this magnetic head, the recording magnetic field becomes steep, suppressing the medium noise.

The MR read head produces a read output with more than five times the amplitude of the output of the conventional inductive magnetic head, which also constitutes one of the major factors contributing to the realization of a large-capacity magnetic disk apparatus.

The combination of the magnetic recording medium and the dual magnetic head can be further combined with a signal processing circuit that uses partial response maximum likelihood technology, and with a circuit to correct asymmetry of the read signal from the magnetoresistive head. In addition to this, the flying height of the slider of the magnetic head is preferably set to less than 0.05 μm. These arrangements result in a magnetic recording system having more than three times the capacity of the conventional system.

DETAILED DESCRIPTION OF THE PREFERRED EMBODIMENTS

Figure 1:
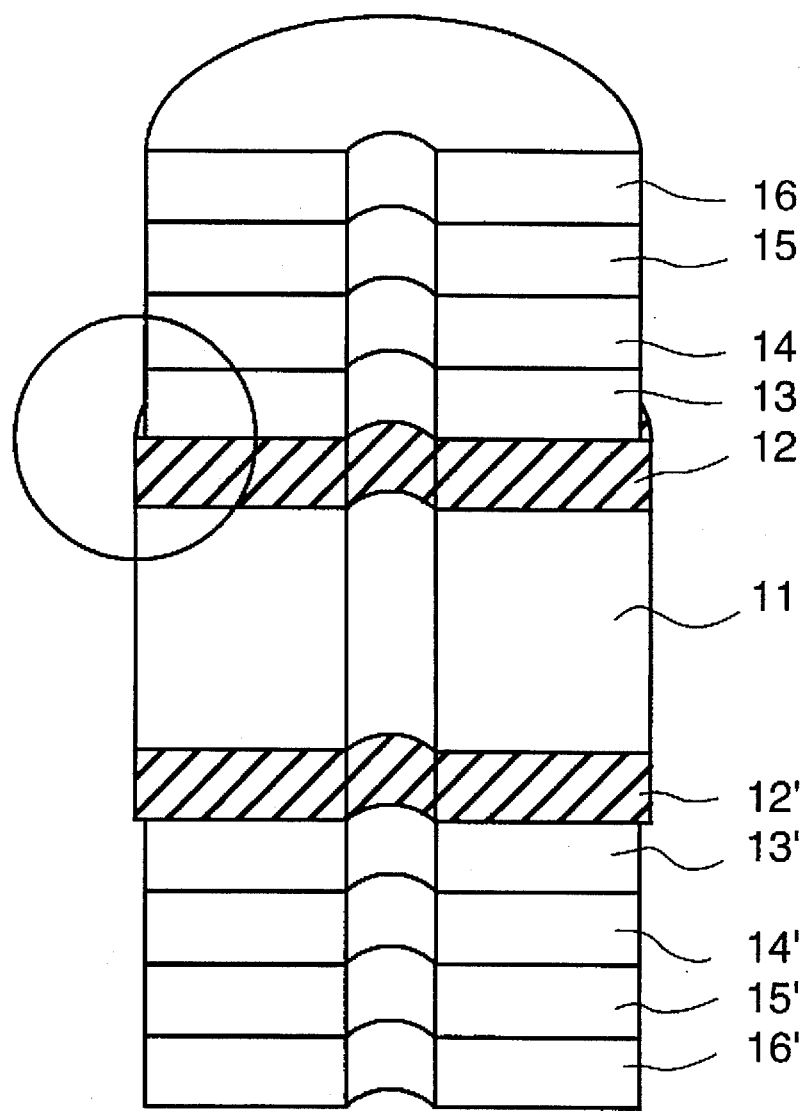
FIG. 1 is a schematic view showing a cross-sectional structure of a magnetic recording medium constructed according to the teachings of a first embodiment of the present invention.

FIG. 1 shows a cross-section of a magnetic recording medium designed according to the teachings of the invention. Each of the layers is preferably formed by sputtering. A nonconductive substrate 11, which may be of reinforced glass, canasite (crystallized glass), ceramic (such as SIC), plastic, TiO, or Ti alloy, is first formed. Before forming the conducting precoat layer over the substrate, a sputter etching using Ar may be carried out to reduce the influence of residual contamination on the substrate surface. Then, conducting precoat layers 12, 12' are formed. Possible conducting precoat layers include C, Ti, V, Cr, Cu, Zn, Nb, Mo, Ru, Rh, Pd, Ag, Ta, W, Pt, Au, Ni-P and Cr-P. These are preferred in terms of controlling the crystallographic property, crystallographic orientation and crystal grain size of the underlayer and the magnetic layer. Two or three of these elements may be combined for use. Further, it may be desirable to form an additional oxide layer, nitride layer or carbide layer over the surface of the conducting precoat layer, to increase the coercivity by 5–20%. The additional oxide layer, nitride layer or carbide layer is preferably 0.1–10 nm thick.

Nonmagnetic underlayers 13, 13' are formed on the precoat layers. The underlayers 13, 13' are preferably formed of Cr, Mo, W, Ta or Nb, or of an alloy containing one of these as a major element, such as Cr-P, Cr-Ti, Cr-V, Cr-Mo, Mo-Nb, Mo-Pt, Mo-Ge, W-Cr, W-Ta and W-Si. These materials are advantageous in terms of controlling the crystallographic property, crystallographic orientation and crystal grain size. The underlayer preferably has a thickness in the range of 0.1–500 nm, which is desirable for enhancing the S/N ratio. The material of the underlayer determined depending on the material of the magnetic layer.

The magnetic layers 14, 14' are preferably made from a magnetic alloy containing Co as a main element, such as CoCrPt, CoCrTa, CoNiPt, CoNiTa, CoSiPt, CoSiTa, CoCrPtB, and CoCrTaB, to secure a high coercivity and a high recording density. The thickness of the magnetic layer, when a multiple magnetic layer medium is employed, should preferably be in the range of 0.2–50 nm for each layer to increase the S/N ratio.

Reference numerals 15, 15' represent protective layers made from such materials as C, WC, (WMo)C, (ZrNb)N, $B_4C$ and a hydrogen-containing carbon layer. Finally, lubrication layers 16, 16' are formed from perfluoroalkyl-polyether on the protective layers 15, 15'.

The product of remanent magnetization and magnetic layer thickness for the medium can be maintained in the 10–150 G.μm range and the coercivity in the 1600–4000 Oe range by appropriate selection of the substrate temperature, sputter gas (such as He, Ne, Ar, Kr and Xe), gas pressure, and input power during the sputtering, according to the composition and the film structure. The magnetic recording media described below all meet these conditions.

In a first embodiment of the medium, Cr was deposited to a thickness of 25 nm as conducting precoat layers 12, 12' by a DC magnetron sputtering method on a room-temperature glass substrate (Corning 0313) 11, 95 mm in outer diameter, by Ar gas pressure at 1.7 mTorr and input power density of 5 W/cm$^2$. Next, with the substrate temperature at 300° C., Ar gas pressure at 1.7 mTorr and input power density of 5 W/cm$^2$, a DC magnetron sputtering method which applies a DC bias voltage was used to deposit Cr to a thickness of 250 nm for nonmagnetic underlayers 13, 13', and Co-16at% Cr-4at% Ta to a thickness of 25 nm for magnetic layers 14, 14', successively. The DC bias voltage was applied, with a conductive jig held in contact with the surface of the conducting precoat layers 12, 12', to the stacking surfaces of the nonmagnetic underlayers 13, 13' and magnetic layers 14, 14'. As the final step, after C was deposited to a thickness of 10 nm as the protective layers 15, 15', lubrication layers 16, 16' of perfluoroalkyl-polyether were formed to a thickness of 3 nm.

Figure 2:
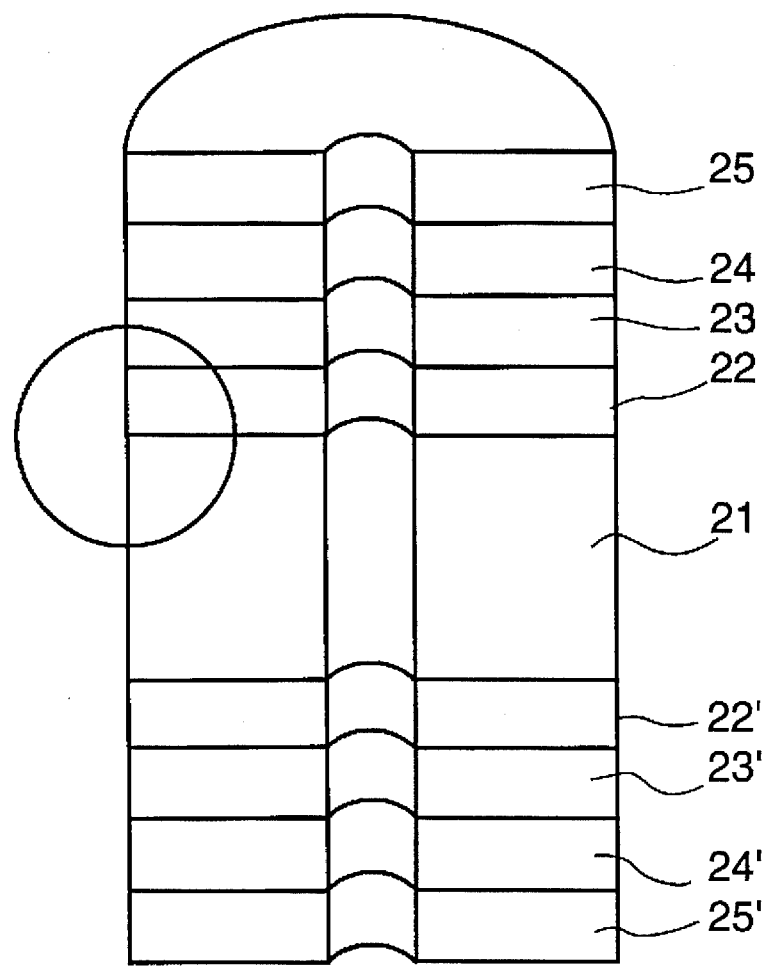
FIG. 2 is a schematic view showing a cross-sectional structure of a conventional magnetic recording medium.

As a comparison sample, a medium with no conducting layer as shown in FIG. 2 was fabricated under similar film-forming conditions, except that the bias voltage was 0 V. In FIG. 2, the nonmagnetic underlayers 22, 22', magnetic layers 23, 23', protective layers 24, 24', and lubricating layers 25, 25' are formed on substrate 21.

Comparison of the medium structures of FIG. 1 and FIG. 2 shows that the areas of the nonmagnetic underlayers 13, 13', the magnetic layers 14, 14', and the protective layers 15, 15' of this embodiment shown in FIG. 1 are smaller than those of the counterparts 22, 22'; 23, 23'; and 24, 24' of FIG. 2, because the jig, which contacted the outer circumference of the conductive layers, prevented the films deposited after the conducting layers from being formed at the outer circumference.

Conduction between the conducting layer and the substrate electrode may be ensured by making contact between them at their respective inner circumferences or at a portion where the conducting layer extends to overlap the substrate side surface. It is easily understood that, as to the contact area, the conducting layer and the substrate electrode need not have contact over one complete circumference of the disk, but point contact will suffice.

Figure 3:
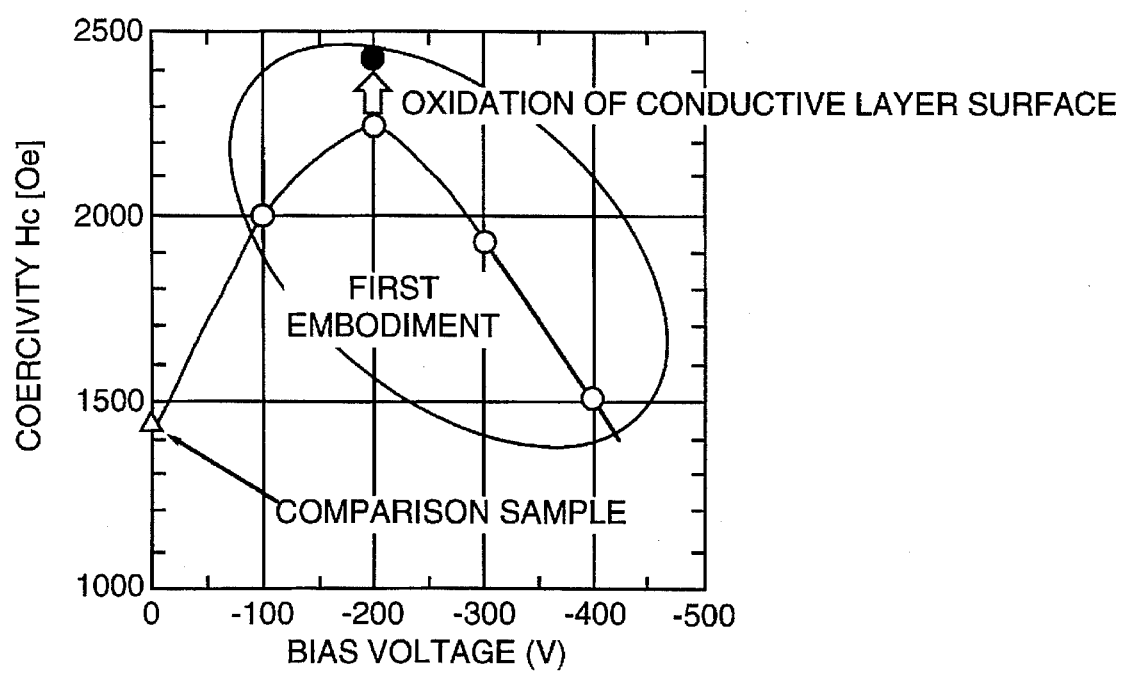
FIG. 3 is a diagram comparing the coercivities of magnetic recording media of the first embodiment with that of the conventional medium.

FIG. 3 shows the coercivities of the first embodiment and of a medium fabricated as the comparison sample. This diagram shows that coercivity increases as a result of the application of the DC bias voltage, and peaks when the bias is at −200 V. As the bias voltage is further increased in the negative direction, the coercivity decreases until it reaches a minimum at −400 V, equal to that when no bias is applied. From these observations, a conclusion can be drawn that the optimum bias voltage falls in the range of −400 V to −30 V.

When, under the same medium fabrication conditions as the first embodiment, the composition of the magnetic layer was changed from Co-14at% Cr-6at% Ta to Co-18at% Cr-8at% Pt, Co-30at% Ni-5at% Pt, Co-20at% Ni-10at% Cr, Co-16at% Si-6at% Ta, Co-20at% Si-10at% Pt, Co-15at% Cr-4at% Ta-4at% B, or Co-16at% Cr-8at% Pt-4at% B, similar results were obtained, although slight differences occurred in the absolute values of the coercivity. After the conducting layers 12, 12' were formed, the vacuum in the film forming apparatus was broken to expose the films to the open air to form a thin oxide layer over the conducting layer surface (as noted above, a nitride or carbide layer may also be formed to similar effect). As a result, the coercivity increased by about 100–400 Oe. Application of the DC bias solely during the magnetic layer forming process produced similar results, but applying the DC bias solely during the underlayer forming process failed to improve the coercivity; that is, almost no effect traced to the bias sputtering was observed.

Figure 4:
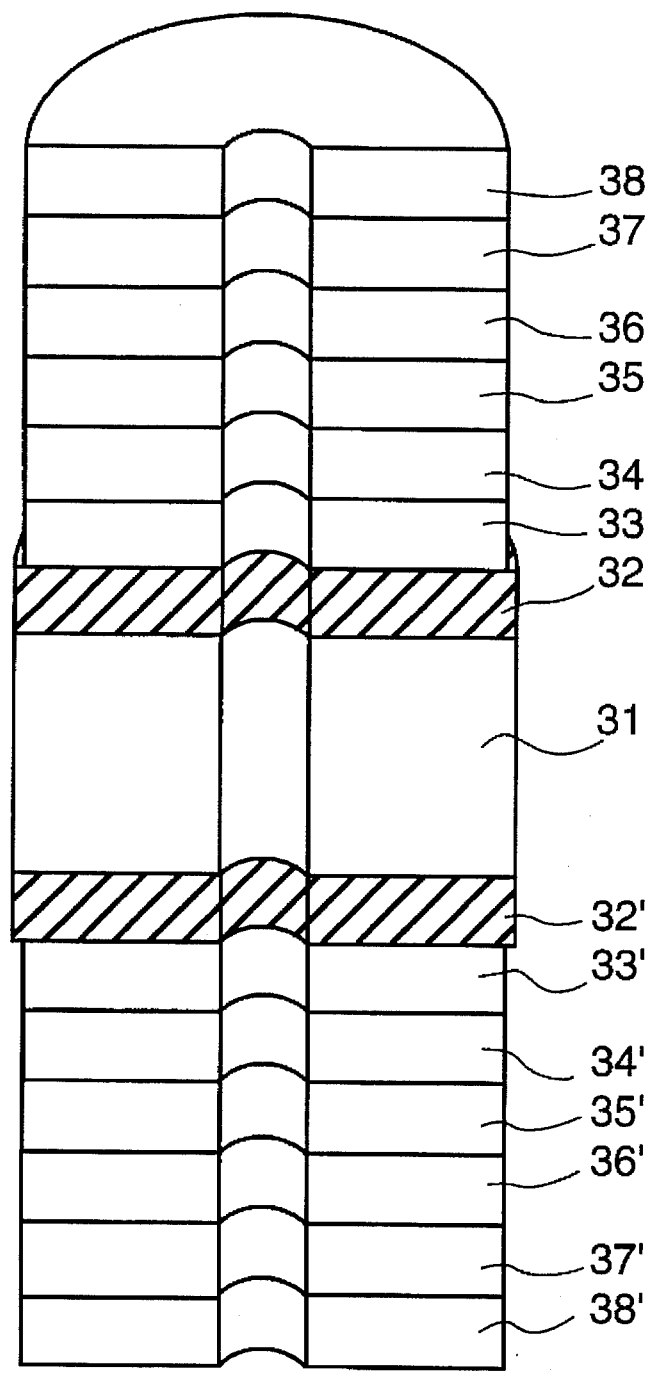
FIG. 4 is a schematic view showing a cross-sectional structure of a magnetic recording medium constructed according to a second embodiment of the invention.

In a second embodiment, a canasite (crystallized glass) substrate 31, 2.5 inches across, was used to fabricate a multiple magnetic layer recording medium with the construction shown in FIG. 4. With the substrate at room temperature, Xe gas pressure at 1.7 mTorr, and the input power density at 5 W/cm$^2$, the DC magnetron sputtering method was used to deposit Cr to a thickness of 50 nm to form the conducting layers 32, 32'. Next, with the substrate temperature at 300° C., Xe gas pressure at 1.7 mTorr and input power density at 5 W/cm$^2$, a DC magnetron sputtering method was used while changing the DC bias voltage in the −100 to −400 V range to deposit Cr-15at% Ti to a thickness of 150 nm for the nonmagnetic underlayers 33, 33', and Co-19at% Cr-8at% Pt to a thickness of 12 nm for the first magnetic layers 34, 34'. Further, Cr-15at% Ti was deposited to a thickness of 2 nm for the nonmagnetic intermediate layers 35, 35', and Co-19at% Cr-8at% Pt to a thickness of 12 nm for the second magnetic layers 36, 36'. Finally, a hydrogen-containing carbon layer was deposited to a thickness of 10 nm for the protective layers 37, 37'. After this, lubrication layers of perfluoroalkyl-polyether 38, 38' were formed to a thickness of 3 nm.

A medium with no conducting layer was fabricated as a comparison sample in the same way as for the first embodiment, under similar conditions except that the bias voltage was set to 0 V.

Figure 5:
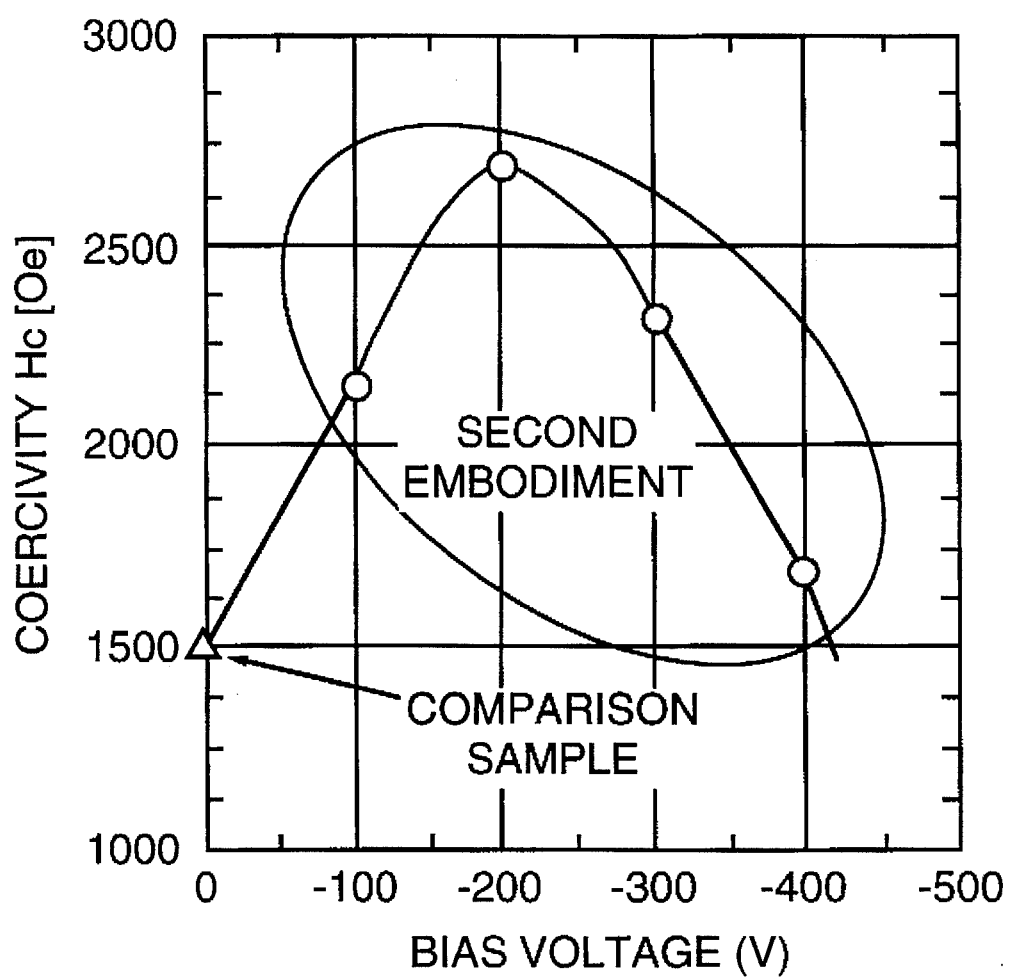
FIG. 5 is a diagram comparing the coercivities of magnetic recording media of the second embodiment with that of the conventional medium.

FIG. 5 shows the coercivities of the second embodiment and of the magnetic recording medium fabricated as the comparison sample. The diagram shows that similar results to those of the first embodiment were achieved, i.e., a higher coercivity can be obtained with a medium fabricated by applying a bias voltage. When the number of magnetic layers was increased to three, four or five, or when the magnetic layers were made of different respective compositions in the same medium, similar results were also obtained.

The read/write characteristics of the magnetic recording of the first and second embodiments were measured by using a dual head having a combination of a write head and a read head. The write head had a magnetic material having a saturation magnetic flux density of more than 1.2 T in at least a part of the magnetic core, and a read head utilizing a giant magnetoresistance effect. The linear recording density was set to 180 kFCI, the track width to 2 µm, the gap length of the write head to 0.2 µm, the shield interval of the read head to 0.2 µm, and the flying height of the magnetic head slider to 0.04 µm. The signal-to-noise ratio (S/N ratio) of the read signal measured under the above conditions was highest at 35 dB with a medium constructed according to the first embodiment that had the highest coercivity, and which was manufactured by using a bias voltage of −200 V. Other media were able to exhibit S/N ratios of at least 32 dB.

Of the magnetic recording media of the second embodiment, the one having the highest coercivity, and which was fabricated by applying a bias of −200 V, exhibited the highest S/N ratio at 38 dB. Other media produced S/N ratios of at least 33 dB.

Considering that the S/N ratio required to operate the system normally is about 30 dB, the magnetic recording media constructed according to the first and second embodiments have good read/write characteristics. The media of the second embodiment have particularly fine S/N ratios compared to those of the first embodiment, because they have significantly lower noise. Considering the increased costs of actual mass-production, however, there is likely to be no need to choose overspecifications. Rather, it is desirable to adopt a low-cost medium structure that meets the necessary requirements.

Figure 6A:
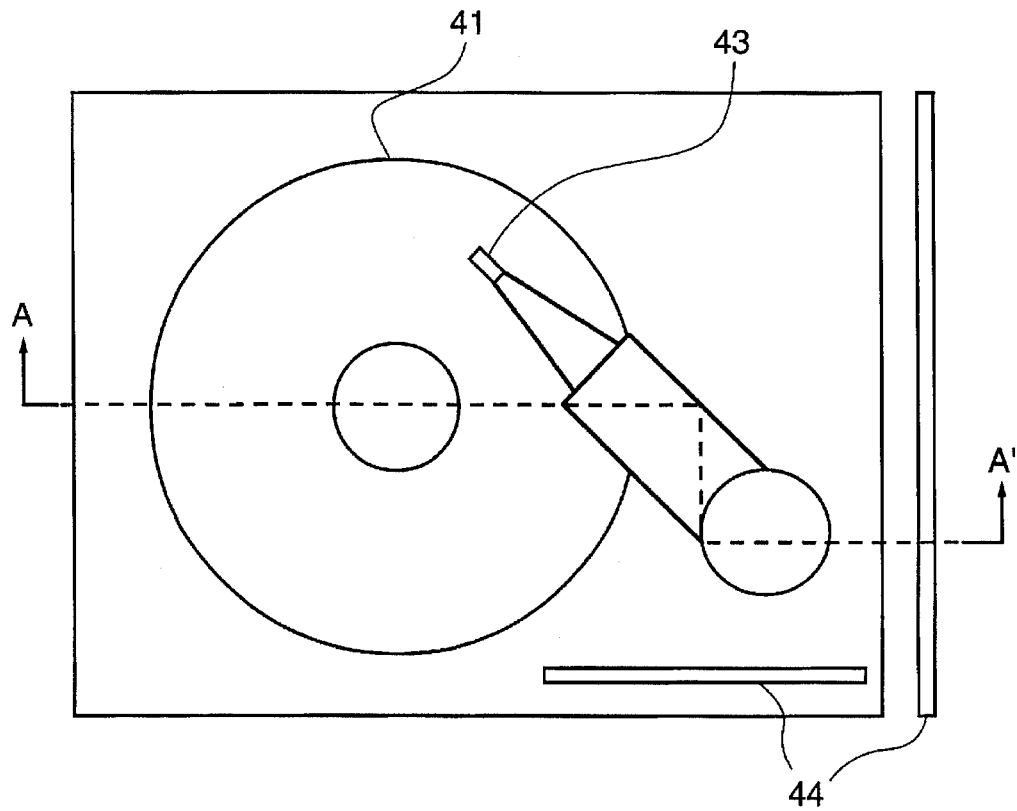
FIGS. 6(a) and 6(b) are schematic views showing a top and a cross-sectional structure of a magnetic recording system employing the teachings of the present invention.
Figure 6B:
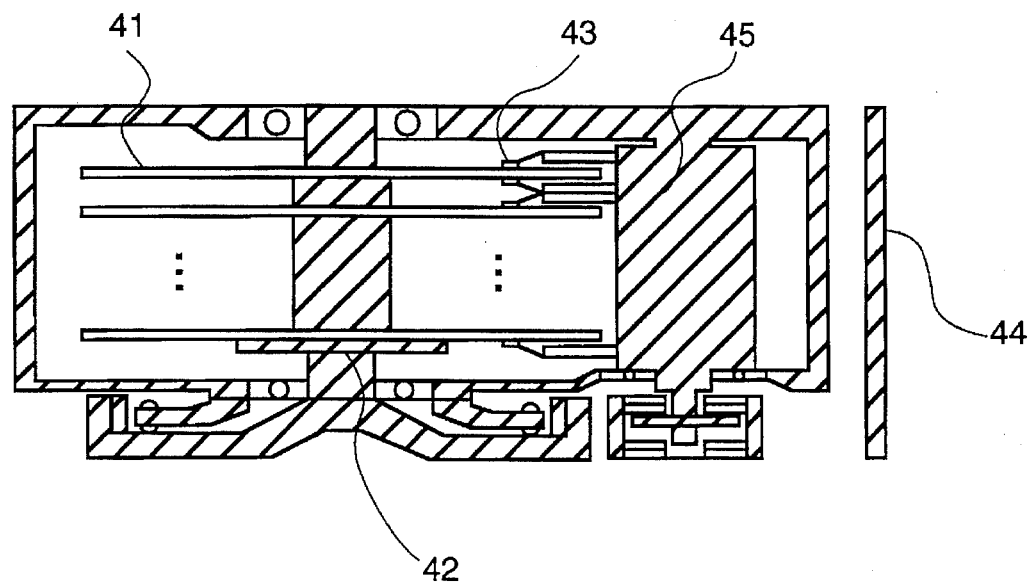

A top view of one example of a magnetic recording system employing the teachings of the invention is shown in FIG. 6(a), and its cross-section along line A–A' is shown in FIG. 6(b). A magnetic recording medium 41 is held by a supporting device that is coupled to a magnetic recording medium drive unit 42. Magnetic heads 43 are arranged to face both sides of the magnetic recording medium 41. Signals reproduced by the magnetic head 43 are processed by a read/write signal processing system 44. Illustratively, waveforms reproduced by the magnetoresistive head have asymmetric positive and negative amplitudes because of a problem characteristic of the read head element. It is therefore necessary to correct this asymmetry.

It is also important to have the corrected signals processed by a signal processing circuit which consists of a signal processing LSI that utilizes maximum likelihood decoding and thus has a very low error rate. The waveform processing is performed by the read/write signal processing system 44.

The magnetic head 43 is stably floated at a flying height of less than 0.05 µm (limited primarily by the flatness of the recording medium; current technology has a practical minimum of 0.045–0.05 µm, but 0.02 µm is now possible), and is driven by a magnetic head drive unit 45 to a desired track with a head positioning accuracy of within 0.4 µm. With these components combined, the high-density magnetic recording system has a storage capacity of more than three times that of the conventional system. Further, even when the signal processing circuit and the circuits that correct the asymmetry of reproduced signals from the magnetoresistive head are omitted from the signal processing system 44, the magnetic recording system has a storage capacity of more than two times that of the conventional system.

The factors contributing to these improvements are explained as follows. A write head that uses a magnetic material having a saturation magnetic flux density of more than 1.2 T in at least a part of its magnetic core has a greater recording magnetic field than that of the conventional magnetic head, which has a saturation magnetic flux density of only about 1 T. The apparatus employing the inventive medium can thus take advantage of significant improvements in the overwrite characteristics of the medium. Furthermore, with this magnetic head, the recording magnetic field becomes steep, suppressing the medium noise.

The MR read head produces a read output with more than five times the amplitude of the output of the conventional inductive magnetic head, which also constitutes one of the major factors contributing to the realization of a large-capacity magnetic disk apparatus.

In combination with the magnetic recording medium and the dual magnetic head, the signal processing circuit that uses partial response maximum likelihood technology, the circuit to correct asymmetry of the read signal from the magnetoresistive head, and the reduced flying height result in a magnetic recording system having more than three times the capacity of the conventional system.

Figure 7:
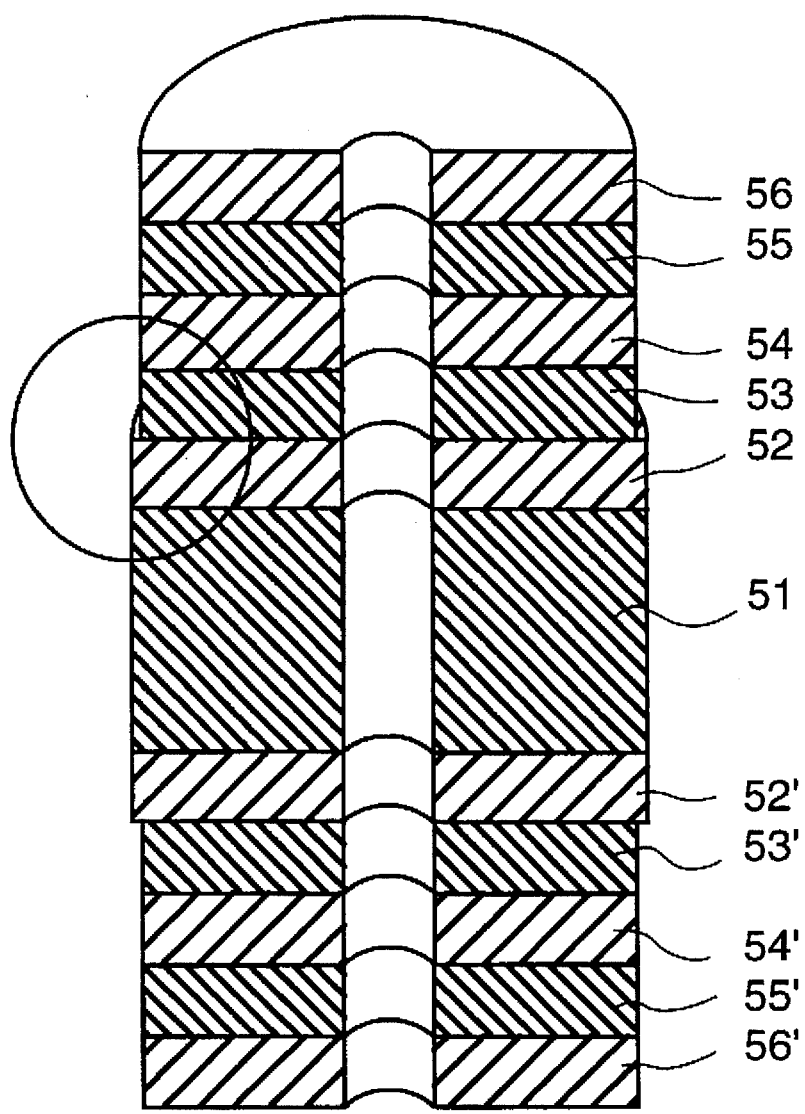
FIG. 7 shows a schematic cross-section of a magnetic recording medium constructed according to a third embodiment of the invention.

FIG. 7 shows a cross-section of a third embodiment of a magnetic recording medium that has been fabricated according to the teachings of the present invention. Each of the layers was formed by the sputtering method explained below.

Over a reinforced glass substrate (Corning 0313) 51 that was 95 mm in outer diameter, Cr was deposited to a thickness of 25 nm to form conducting precoat layers 52, 52' by a DC magnetron sputtering method. The substrate temperature was 300° C., the gas pressure 2.5 mTorr, and the input power density 5 W/cm$^2$. Ar was used as the sputter gas.

Next, with the substrate temperature at 300° C., gas pressure at 2.5 mTorr and input power density at 5 W/cm$^2$, a DC magnetron sputtering method employing a DC bias voltage was used to deposit Cr to a thickness of 50 nm to form underlayers 53, 53', and Co-19at% Cr-8at% Pt to a thickness of 25 nm to form magnetic layers 54, 54', successively. The DC bias voltage was applied such that, with a conductive jig (not shown) held in contact with the surface of the conducting precoat layers 52, 52', the DC bias voltage was applied to the stacking surfaces of the underlayers 53, 53' and magnetic layers 54, 54'. The applied voltage was varied in the range of −100 V to −400 V, and Kr, Xe, and Rn were separately used as the sputter gas. The resulting magnetic layers 54, 54' contained Kr, Xe, or Rn in concentrations greater than 100 ppm.

In a final step, Ar was used as a sputter gas and, with no bias voltage applied, C was deposited to a thickness of 10 nm to form the protective films 55, 55', after which lubrication layers 56, 56' of perfluoroalkyl-polyether thick were formed to a thickness of 3 nm.

With this magnetic recording medium, as shown encircled in FIG. 7, the areas of the substrate 51 and the conducting precoat layers 52, 52' are smaller than those of the underlayers 53, 53', the magnetic layers 54, 54' and the protective layers 55, 55'. This is because the DC bias voltage application jig supported the outer circumference of the conductive layers 52, 52', preventing the films deposited after the conducting precoat layers from being formed at the outer circumference.

Conduction between the conducting precoat layer and the substrate electrode may be made by a contact at the inner circumference of the medium or at a portion where the conducting precoat layer extends to overlap the substrate side surface at the outer circumference. When the contact between the conducting precoat layer and the substrate electrode is located at the inner or outer circumference of the magnetic recording medium in this way, the intermediate portion of the disk (i.e., between the inner and outer circumferences) can be effectively utilized as a recording region. It is easily understood that, as to the contact area, the conducting precoat layer and the substrate electrode need not contact each other over a complete circumference of the disk, but point contact will suffice.

Next, two magnetic recording media were prepared for comparison with the third embodiment. One was fabricated by varying the bias voltage in the range of −100 V to −400 V under the same conditions as the third embodiment, except that Ar was used as the sputter gas. The other was fabricated under the same conditions as the third embodiment, except that each of Ar, Kr, Xe, and Rn was separately used as the sputter gas and the bias voltage was set to 0 V.

Figure 8:
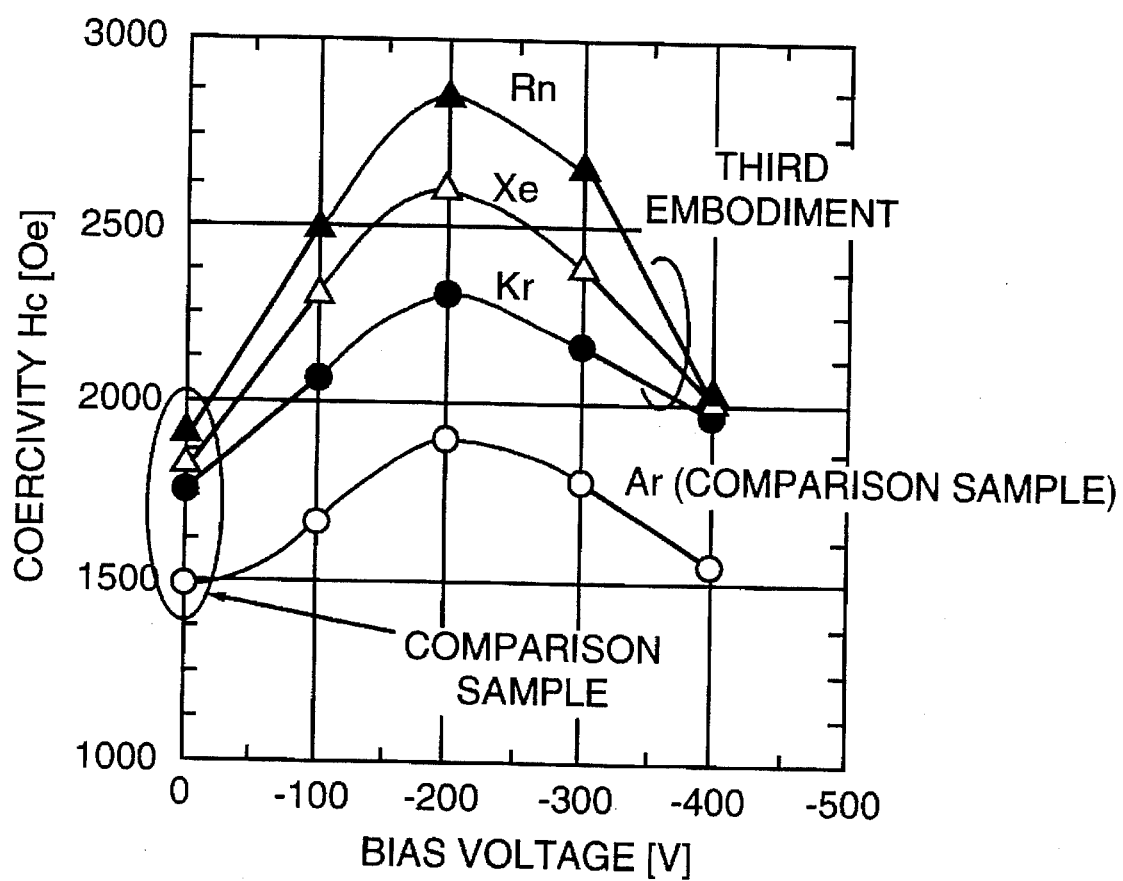
FIG. 8 shows a graph comparing the coercivities of magnetic recording media of the third embodiment with a comparison sample.

FIG. 8 shows the coercivities of the third embodiment and of the comparison samples. This diagram shows that, in each of the media fabricated using the above sputter gases, the coercivity increases as a result of application of the DC bias voltage and peaks when the bias is at −200 V. As the absolute value of the negative bias voltage is further increased, the coercivity decreases until, at a −400 V bias, it reaches the lowest level, equal to that when no bias was applied.

A coercivity comparison is made for different sputter gases. The largest coercivity is presented by the medium fabricated with Rn, followed by those fabricated with Xe, Kr and Ar in that order. Of the comparison media using Ar, even the medium exhibiting the largest coercivity does not reach the level of 2000 Oe. Thus, the greater the atomic weight of the sputter gas, the higher the coercivity of the medium. It is thus possible to produce more than 2000 Oe by selecting Rn, Xe or Kr as a sputter gas in the bias sputtering method.

From FIG. 8, one sees that the most suitable bias voltage falls in the range of −400 V to −30 V for Rn, Xe, or Kr as the sputter gas.

When, under the same magnetic recording medium fabrication conditions as for the third embodiment, the composition of the magnetic film was changed from Co-16at% Cr-4at% Ta to Co-15at% Cr-12at% Pt, Co-30at% Ni-5at% Pt, Co-20at% Ni-10at% Cr, Co-16at% Si-6at% Ta, Co-20at% Si-10at% Pt, Co-15at% Cr-4at% Ta-4at% B, and to Co-16at% Cr-8at% Pt-4at% B, similar results to those of FIG. 8 were obtained, although slight differences occurred in the absolute values of the coercivity. That is, the magnetic layer may use materials containing Co as a main component, such as CoCrPt, CoCrTa, CoNiPt, CoNiTa, CoSiPt, CoSiTa, CoCrPtB, and CoCrTaB.

Similar results were also obtained when the conducting precoat layers 52, 52' were formed of one of C, Ti, V, Cu, Zn, Nb, Mo, Ru, Rh, Pd, Ag, Ta, W, Pt, Au, Ni-P, and Cr-P, or a combination of two or three of these elements.

After the conducting precoat layers 52, 52' were formed, the vacuum in the film-forming apparatus was broken to expose the films to the open air to form a thin oxide layer over the conducting precoat layer surface. As a result, the coercivity increased by about 100–400 Oe. Improvements in coercivity were also obtained when a thin nitride layer or carbide layer was formed over the surface of the conducting precoat layer. The nitride layer was formed by exposing the conducting precoat layer to a nitrogen atmosphere or by mixing a trace amount of nitrogen in the target. The carbide layer was formed by mixing a trace amount of carbon in the target, forming a thin carbon film over the surface, or by ion implantation.

Application of the DC bias solely during the magnetic layer-forming process improved the coercivity of the magnetic layer. However, applying the DC bias solely during the underlayer forming process failed to improve the coercivity of the magnetic layer; that is, almost no improvement due to the bias sputtering was observed.

Although the third embodiment employed a reinforced glass for the substrate, various other substrates may be used, including canasite (crystallized glass), a ceramic (such as SIC), Ni-P/Al, plastic, carbon, boron, TiO, and Ti alloy.

Before forming the conducting precoat layer over the substrate, a sputter etching using Ar, Kr, Xe or Rn may be carried out to reduce the influence of residual contaminations on the substrate surface.

The product of remanent magnetization and magnetic layer thickness can be maintained in the 10–150 G.μm range and the coercivity in the 2000–4000 Oe range by appropriate selection of the substrate temperature, gas pressure and input power during the sputtering according to the magnetic layer composition and structure.

In addition to using Rn, Xe or Kr at concentrations of 100%, as in the third embodiment, a study was also conducted on a gas mixture consisting of Ar mixed with each of these heavy rare gases. By using the same film forming conditions and the same film structure of the magnetic recording medium as the third embodiment, by applying a DC bias voltage of −200 V, and by changing the composition of the sputter gas, various magnetic recording media were fabricated and their coercivities measured. The results are shown in FIG. 9.

Figure 9:
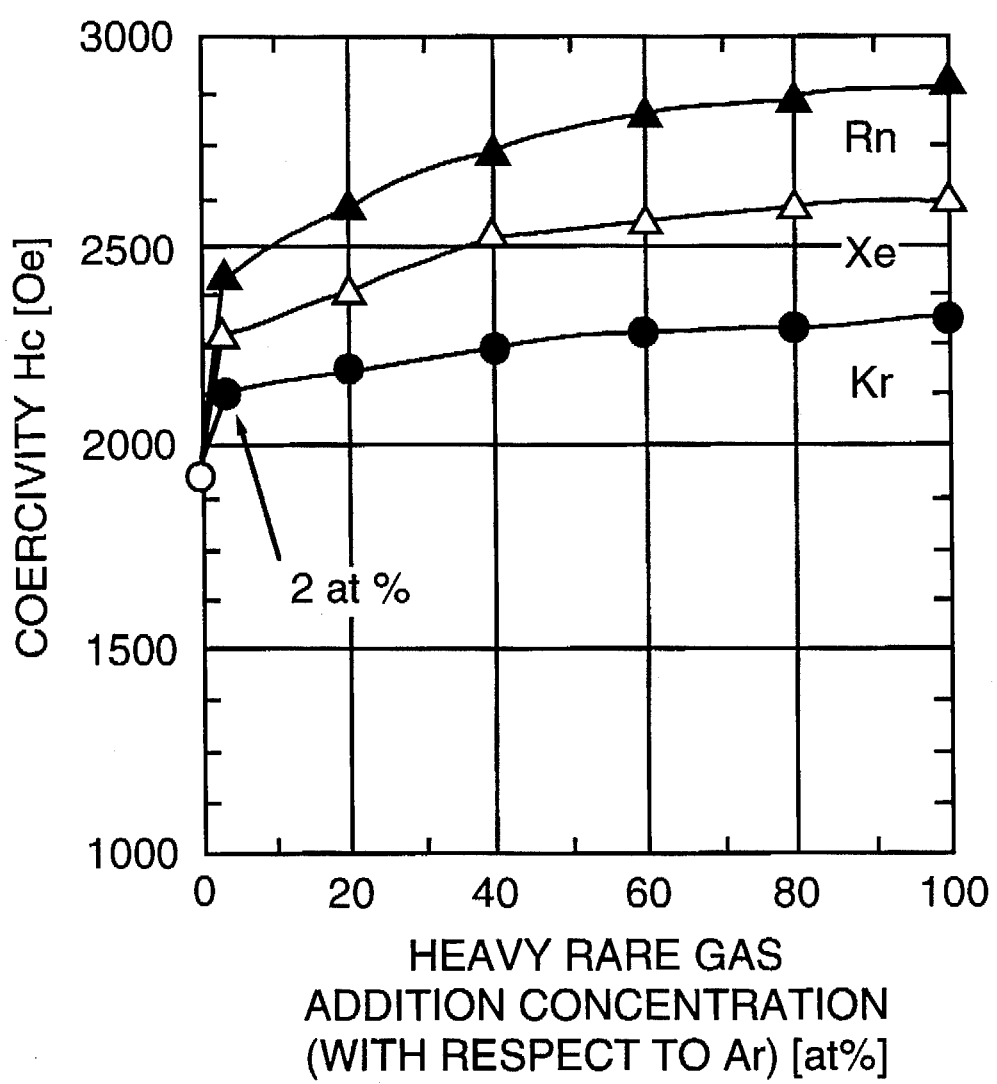
FIG. 9 shows a graph of the relationship between the compositions of sputter gases and the coercivities of magnetic recording media.

FIG. 9 indicates that when the sputter gas mixture contains more than 2at% of Rn, Xe or Kr, the coercivity is higher than when pure Ar is used; note that a coercivity of more than 2000 Oe can still be attained. Further, the three gases Rn, Xe, and Kr may be mixed. When the mixture of the three gases is further mixed with Ar, greater than 2at% of the Rn-Xe-Kr gas mixture should be added to Ar.

Next, evaluation of crystals using X-ray diffraction was conducted on a magnetic recording medium fabricated using Ar gas, and on a magnetic recording medium fabricated using Rn gas. Each of the media tested had an Ni-P/Al substrate as the substrate 51, the same film forming conditions and film structure as for the third embodiment, and a bias voltage of −200 V.

Figure 10:
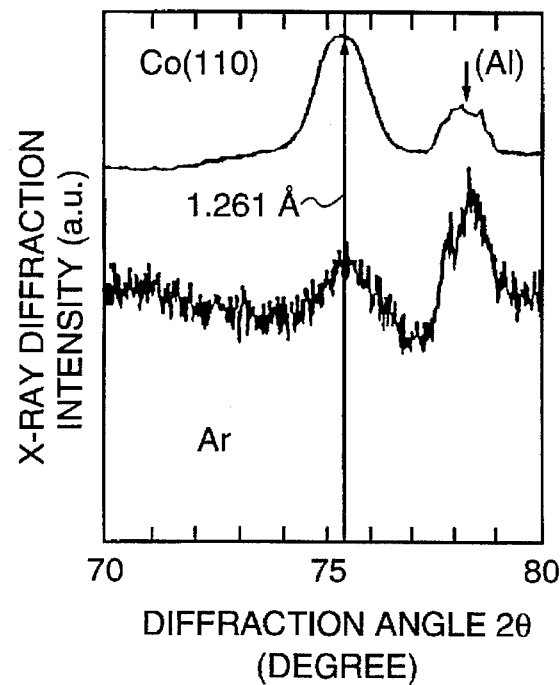
FIGS. 10(a) and 10(b) show graphs of X-ray diffraction intensities of a magnetic recording medium fabricated using Ar gas and a magnetic recording medium fabricated using Rn gas.
Figure 10:
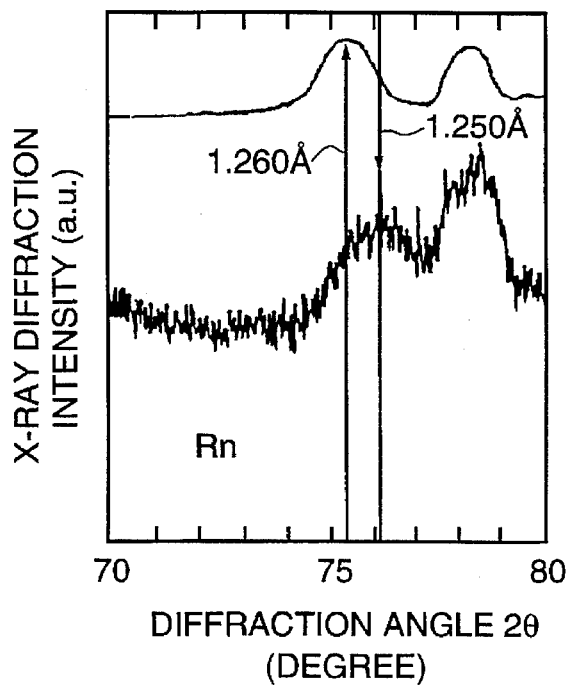

The results are shown in FIGS. 10(a) and 10(b). As shown in FIG. 10(a), for the medium fabricated using Ar gas, the diffraction angle of the Co (110) plane parallel to the layer surface (the upper curve in the drawing) is almost equal to that of the Co (110) plane tilted 60 degrees from the layer surface (the lower curve). The interplanar spacings of the respective planes are both measured at 1.261 Å. With the medium fabricated using Rn gas, on the other hand, the diffraction angle of the Co (110) plane parallel to the layer surface is smaller, as shown in FIG. 10(b). This means that, in the medium fabricated by using the Rn gas while applying a bias to the substrate, the interplanar spacing of the Co (110) plane parallel to the layer surface is larger than that of the Co (110) plane inclined 60 degrees from the layer surface. In fact, the interplanar spacing is larger than that of any Co (110) plane inclined more than 20 degrees. For example, the interplanar spacing of the Co (110) plane parallel to the layer surface which is derived from FIG. 10(b) is 1.260 Å and the interplanar spacing of the Co (110) plane inclined 60 degrees from the layer surface is 1.250 Å.

Another medium was fabricated with all of the layers described above, from conducting precoat layers 52, 52' to protective films 55, 55' as shown in FIG. 7. Xe was used as the sputter gas, and a bias voltage of −200 V was applied during the step of forming the underlayers 53, 53' and the magnetic layers 54, 54'. This medium was subjected to secondary ion mass spectroscopy (SIMS) for element analysis. The results are shown in FIG. 11.

Figure 11:
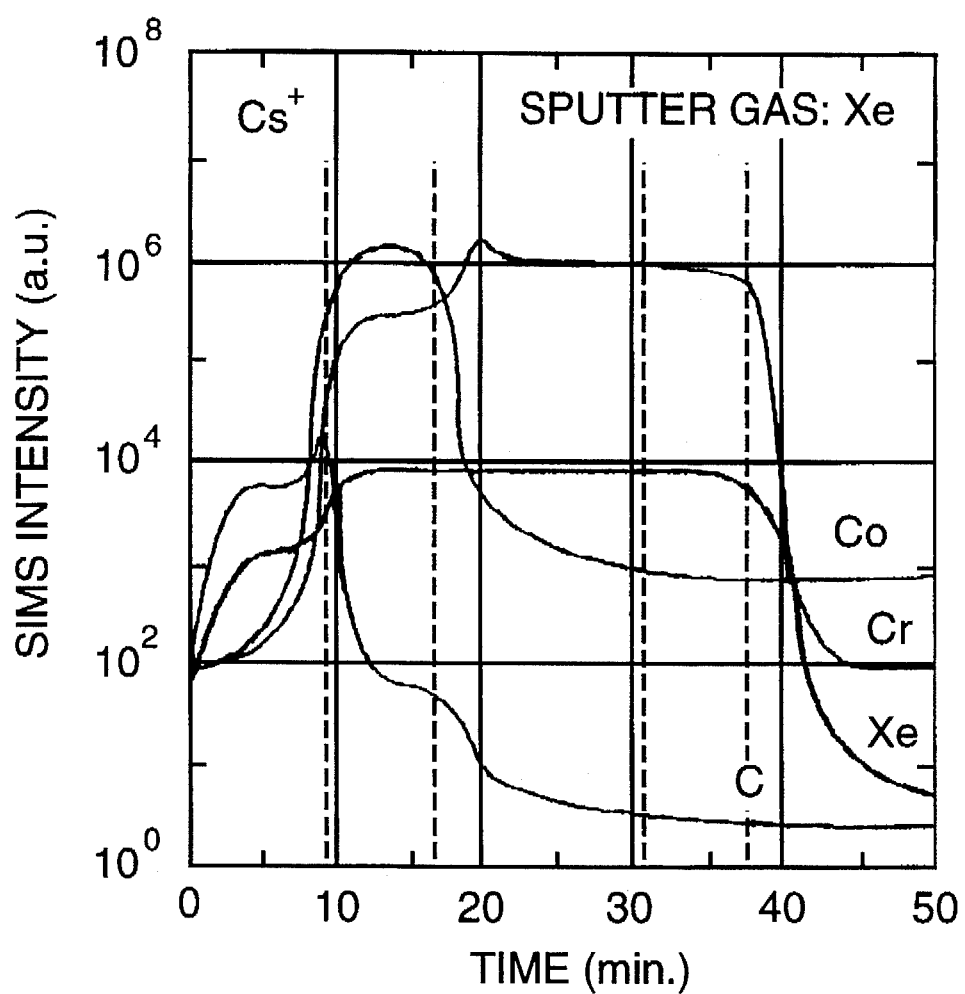
FIG. 11 shows a graph of the results of secondary ion mass spectroscopy (SIMS) on magnetic recording media constructed according to the present invention.

FIG. 11 shows that a greater amount of Xe was detected in the underlayer and magnetic layer, both of which were formed by applying a bias. Thus, application of a bias causes a greater amount of Xe gas to be absorbed in the film.

Figure 12:
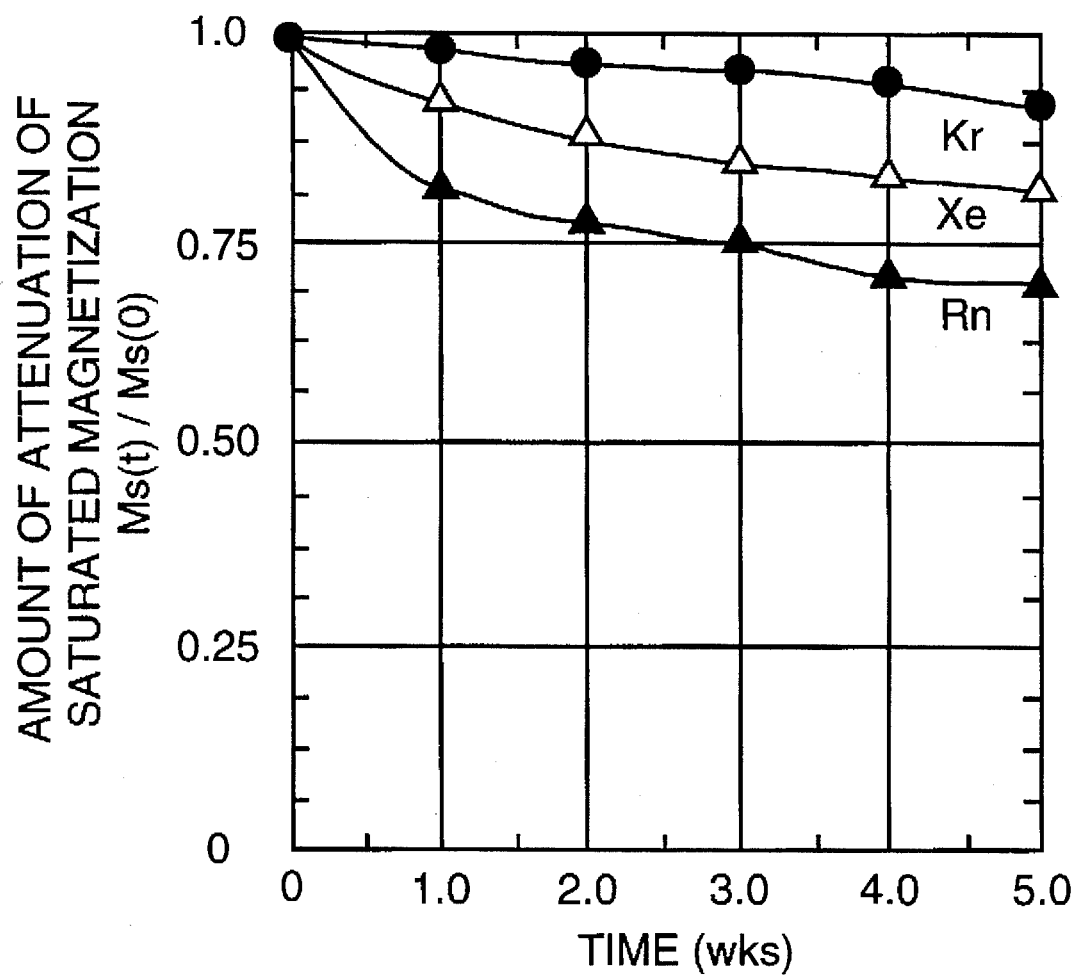
FIG. 12 shows a graphical comparison of corrosion resistance among various magnetic recording media.

Next, media sputtered with Kr, Xe or Rn gas according to the third embodiment were maintained at a temperature of 60° C. and humidity of 90%, and the attenuation of saturated magnetization of each medium was measured to compare their corrosion resistances. The results are shown in FIG. 12. The abscissa of FIG. 12 represents time, and the ordinate represents the saturated magnetization at each point in time normalized by the initial saturated magnetization.

FIG. 12 shows that the medium sputtered with Kr gas has the highest corrosion resistance, followed by those sputtered with Xe and Rn, in that order. Hence, while Rn is most effective in obtaining a high coercivity, Kr provides the highest reliability with respect to corrosion resistance.

Figure 13:
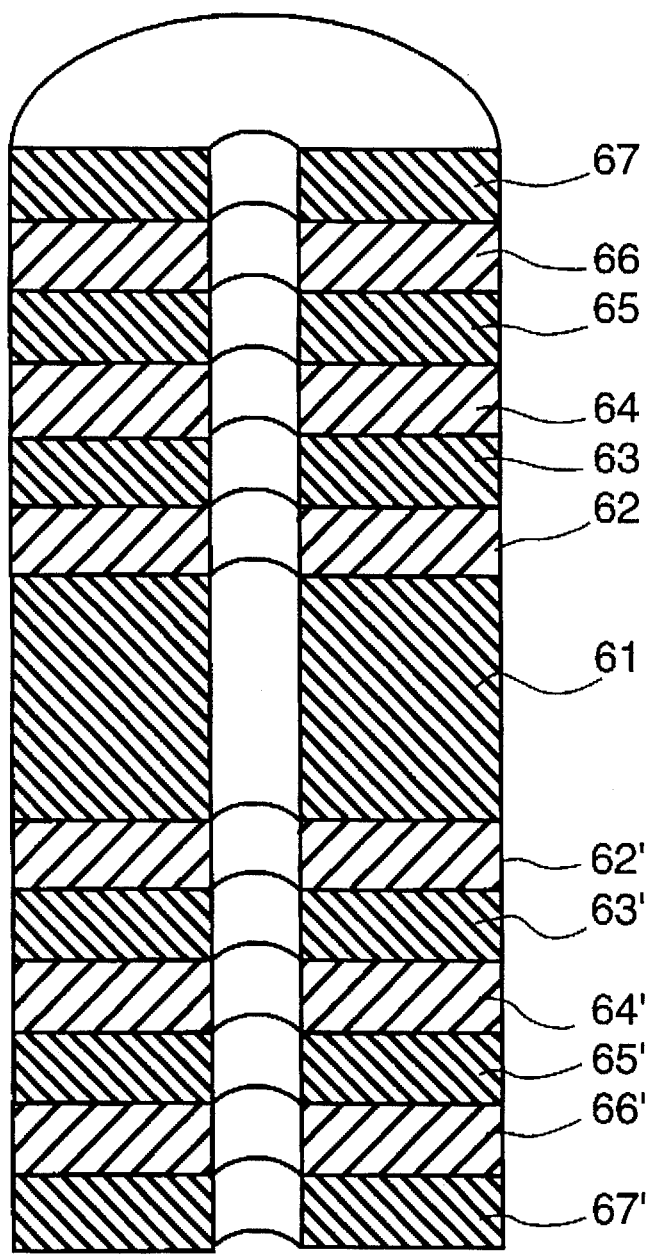
FIG. 13 shows a schematic cross-section of a magnetic recording medium constructed according to a fourth embodiment of this invention.

A cross-section of a fourth embodiment of a magnetic recording medium according to this invention is shown in FIG. 13. The magnetic recording medium has plural magnetic layers, each of which was formed by sputtering as described below.

A canasite (crystallized glass) substrate 2.5 inches across was used for the substrate 61. With a substrate temperature of 300° C., Xe gas pressure of 1.7 mTorr, and input power density of 5 W/cm$^2$, a DC magnetron sputtering method applying an RF bias was used to deposit Cr-15at% Ti to a thickness of 250 nm for the underlayers 62, 62', and Co-19at% Cr-8at% Pt to a thickness of 12 nm for the first magnetic layers 63, 63'. After Cr was deposited to a thickness of 2 nm for the intermediate layers 64, 64', Co-16at% Cr-4at% Ta was formed to a thickness of 12 nm for the second magnetic layers 65, 65'. The RF bias voltage was varied in the range of −100 V to −400 V.

Finally, by using a gas mixture of Xe and methane as a sputter gas, a hydrogen-containing carbon was deposited to a thickness of 10 nm without a bias voltage application to form protective layers 66, 66'. Afterward, lubrication layers of perfluoroalkyl-polyether 67, 67' were formed to a thickness of 3 nm.

A comparison magnetic recording medium having the same multilayered structure as the fourth embodiment was manufactured under the same conditions as the fourth embodiment, except that the bias voltage was set to 0 V.

Figure 14:
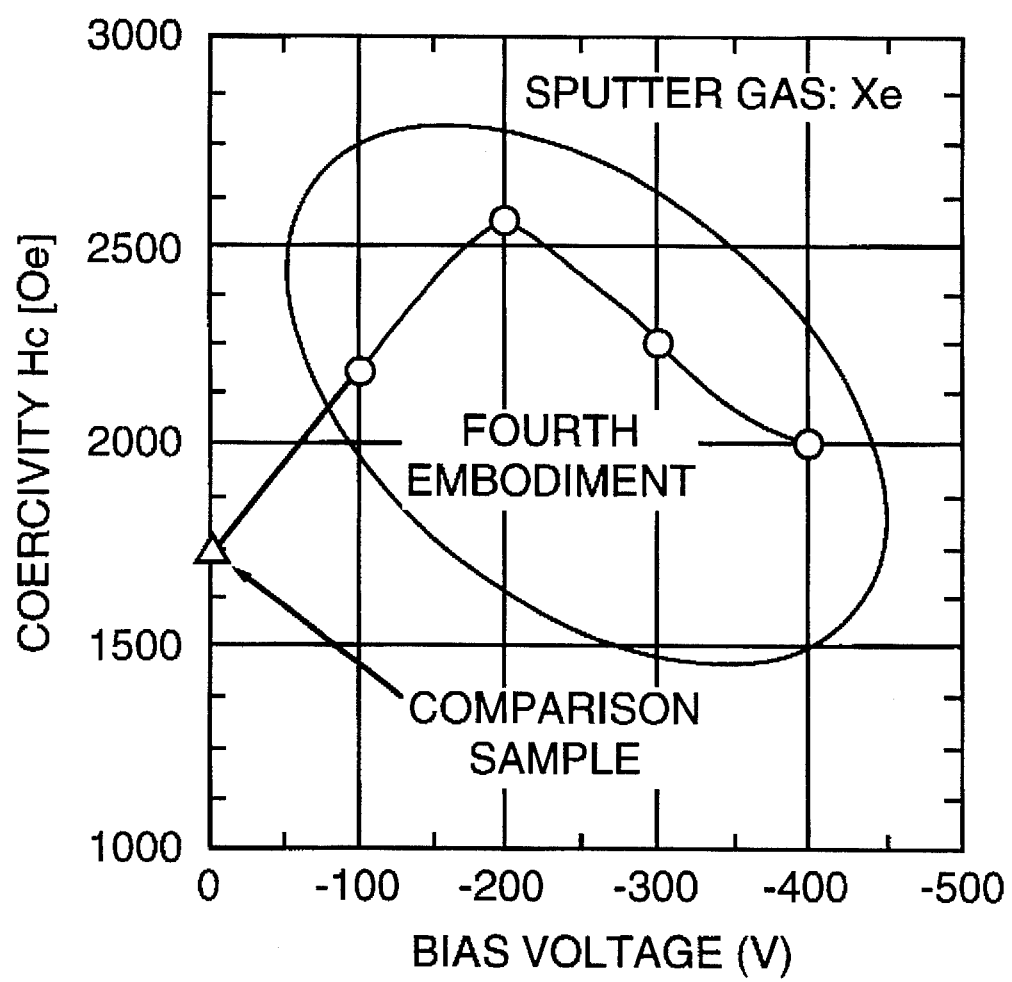
FIG. 14 shows a graphical comparison of the coercivities of various magnetic recording media constructed according to the present invention with conventional media.

The coercivities of the fourth embodiment and of the comparison sample are shown in FIG. 14. As is evident from FIG. 14, the fourth embodiment produced similar results as the third embodiment, i.e., a higher coercivity was obtained with a medium fabricated by applying a bias voltage. When the number of magnetic layers was increased to three, four or five, or when the plural magnetic layers were made of identical compositions, similar results to those of FIG. 14 were obtained.

Further, when a medium having the same multilayered film structure as the fourth embodiment was fabricated using a conductive substrate, such as Ni-P/Al or carbon, and DC bias sputtering, results similar to those of FIG. 14 were obtained.

Figure 15:
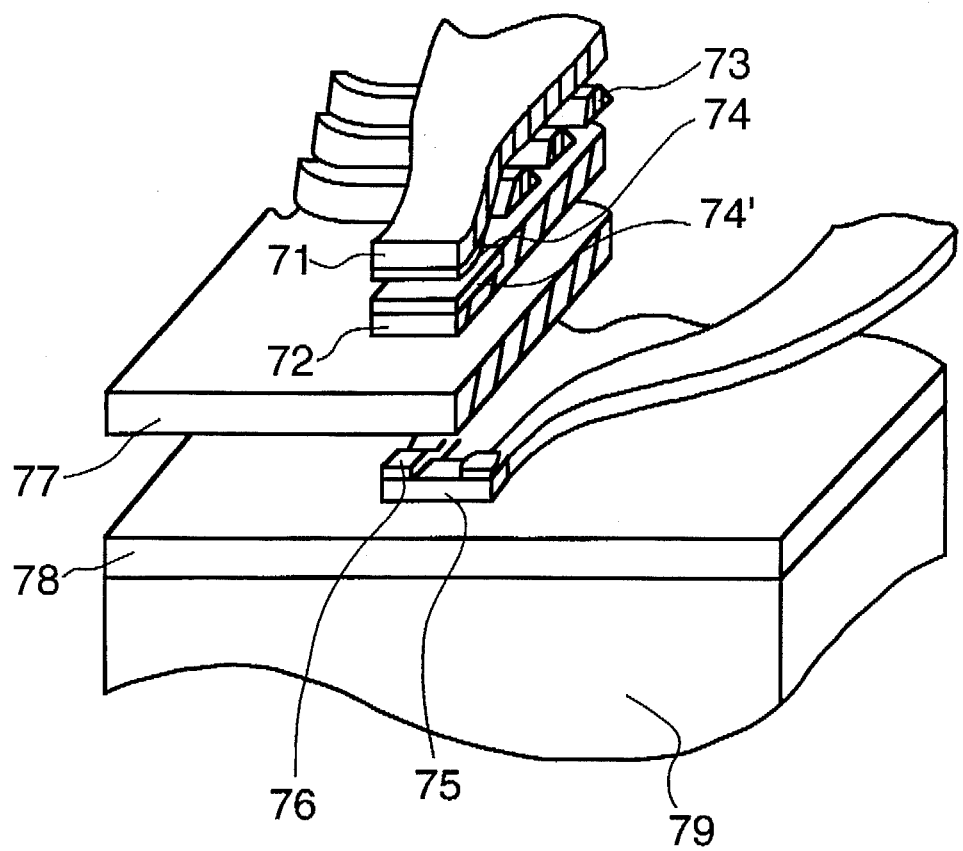
FIG. 15 shows a simplified schematic view of a dual head.

The read/write characteristics of the magnetic recording media of the third and fourth embodiments were measured by using the dual head shown schematically in FIG. 15.

The write head was an inductive thin-film magnetic head consisting of a pair of write magnetic cores 71, 72 and a coil 73 crossing them. To avoid saturation of the magnetic cores, magnetic material 74, 74' (such as CoNiFe) having a saturation magnetic flux density of more than 1.2 T was used in part of the magnetic cores 71, 72. The magnetic material may be provided only to one core, or the entire magnetic core may be made from a magnetic material with the saturation magnetic flux density of 1.2 or higher.

The read head was a magnetoresistive head consisting of a giant magnetoresistance effect element 75 having a NiFe layer and a NiO layer stacked on the NiFe layer, and a conductive layer 76 constituting an electrode. The read head was sandwiched between a pair of magnetic shield layers 77, 78 and provided on a magnetic head slider base 79.

As to the measuring conditions, the linear recording density was set to 190 kFCI, the track width to 2 μm, the gap length of the write head to 0.2 μm, the shield interval of the read head to 0.2 μm, and the flying height of the magnetic head slider to 0.04 μm.

The signal-to-noise ratio (S/N ratio) of the read signal measured under the above conditions was highest at 38 dB with a medium constructed according to the third embodiment. The medium had the highest coercivity, and was manufactured using Rn as a sputter gas and at a bias voltage of −200 V. Other media were able to exhibit S/N ratios of at least 33 dB.

Of the magnetic recording media of the fourth embodiment, the medium having the highest coercivity was fabricated by applying a bias of −200 V, and exhibited the highest S/N ratio at 37 dB. Other media produced S/N ratios of at least 32 dB. Considering that the S/N ratio required to operate the system normally is about 30 dB, the magnetic recording media of the third and fourth embodiments have good read/write characteristics.

Figure 16A:
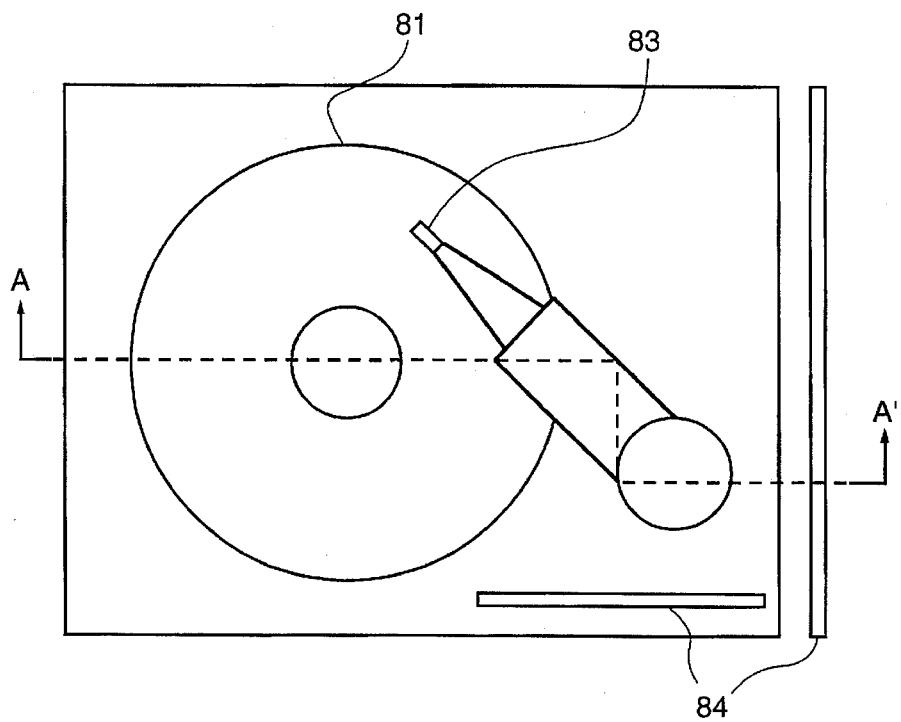
FIGS. 16(a) and 16(b) show a schematic view of a magnetic recording system incorporating the teachings of this invention.
Figure 16B:
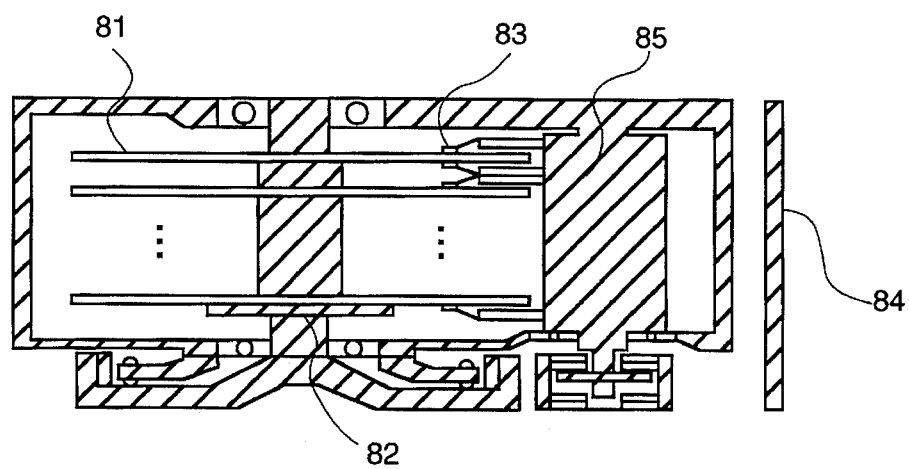

A top view of one example of a magnetic recording system utilizing the teachings of the present invention is shown in FIG. 16(a), and its cross-section along line A–A' is shown in FIG. 16(b).

A magnetic recording medium 81 is held by a supporting device that is coupled to a magnetic recording medium drive unit 82. Magnetic heads 83, shown simplified in FIG. 15, are arranged to face both sides of the magnetic recording medium 81. The magnetic head 83 is stably floated at a flying height of less than 0.05 µm and is driven by a magnetic head drive unit 85 to a desired track with a head positioning accuracy of within 0.4 µm.

Figure 17:
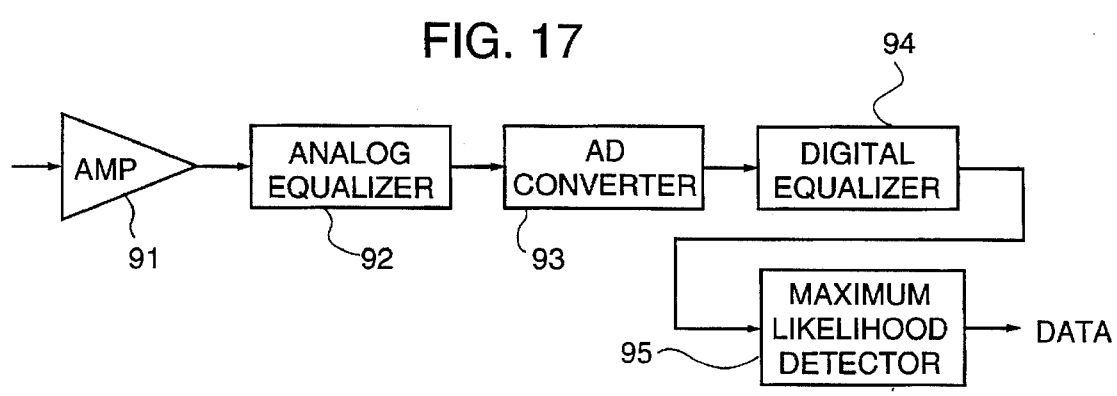
FIG. 17 shows a block diagram of one example of a read/write signal processing system that utilizes the teachings of the present invention.

Signals reproduced by the magnetic head 83 are processed by a read/write signal processing system 84, which includes, as shown in FIG. 17, an amplifier 91, an analog equalizer 92, an AD converter 93, a digital equalizer 94, and a maximum likelihood decoder 95. Waveforms reproduced by the magnetoresistive head may differ from the original recording waveforms because the head characteristics make the positive and negative amplitudes of the signal asymmetric, and because of the influence of the frequency characteristics of the read/write system on the signal. The equalizers 92, 94 have the function of shaping and repairing the reproduced waveforms. The maximum likelihood decoder 95 passes the shaped waveform through a signal processing LSI that uses maximum likelihood decoding, thus forming a signal processing circuit with a very low error rate. This waveform processing is performed by the read/write signal processing system 84. The equalizers and maximum likelihood decoder may be conventional.

With the above-mentioned configuration, a high-density magnetic recording system is realized which has a storage capacity of more than three times that of the conventional system. Further, even when the read/write signal processing system 84 does not include the signal processing circuit 95 and the circuits 92, 94, a magnetic recording system is realized which has a storage capacity of more than two times that of the conventional system.

In the dual head shown in FIG. 15, the magnetic shield layer 77 may be made to serve also as one of the write cores 72, allowing one of the cores 72 of the write head to be omitted.

While the above four embodiments have been described with respect to disk-shaped magnetic recording media and a magnetic recording system using them, the invention is also particularly applicable to magnetic recording media having a magnetic layer on one side only, as in the form of a tape or card, and to magnetic recording systems using such media.

We claim:

1. A magnetic transducing system, comprising:
    a magnetic recording medium;
    a drive unit for driving the magnetic recording medium;
    a magnetic transducing head; and
    means for driving the magnetic transducing head to transduce magnetic recording information with respect to the magnetic recording medium;
    wherein said magnetic recording medium comprises: a substrate;
    a nonmagnetic underlayer on the substrate;
    a magnetic layer on the nonmagnetic underlayer; and
    a protective layer on the magnetic layer;
    wherein the magnetic layer includes at least one heavy rare gas at a total heavy rare gas concentration greater than 100 ppm, each of said at least one heavy rare gas having a greater atomic weight than that of Ar, and
    wherein the substrate includes an electrically-conductive material.

2. A magnetic transducing system according to claim 1, wherein the magnetic transducing head includes a magnetic material having a saturation magnetic flux density greater than 1.2 T.

3. A magnetic transducing system according to claim 1, wherein the magnetic transducing head is a dual, thin-film inductive/giant magnetoresistive head.

4. A magnetic transducing system according to claim 1, wherein the magnetic transducing head has a slider flying height greater than 0 µm and less than 0.05 µm.

5. A method of manufacturing a magnetic recording medium according to claim 1, wherein the magnetic layer has a coercivity between 1600 Oe and 4000 Oe.

6. A magnetic recording medium according to claim 1, wherein the substrate comprises a nonconductive material coated with the electrically-conductive material.

7. A magnetic recording medium according to claim 6, further comprising an electrically-conductive precoat layer on the electrically-conductive material-coated nonconductive-material substrate.

8. A magnetic recording medium according to claim 1, wherein the substrate is an electrically-conductive material.

9. A magnetic recording medium according to claim 1, wherein the magnetic layer has a product of remanent magnetization and magnetic layer thickness between 10 G·µm and 150 G·µm.

10. A magnetic recording medium according to claim 1, wherein the at least one heavy rare gas is a single heavy rare gas selected from the group consisting of Kr, Xe and Rn.

11. A magnetic recording medium according to claim 1, wherein the at least one heavy rare gas include at least two gases selected from the group consisting of Kr, Xe and Rn.

12. A magnetic recording medium according to claim 1, further comprising a plurality of said magnetic layers formed beneath said protective layer, and a nonmagnetic intermediate layer formed between each successive pair of magnetic layers.

13. A magnetic recording medium according to claim 1, wherein the magnetic layer includes Ar atoms.

14. A magnetic transducing system, comprising:
    a magnetic recording medium;
    a drive unit for driving the magnetic recording medium;
    a magnetic transducing head; and
    means for driving the magnetic transducing head to transduce magnetic recording information with respect to the magnetic recording medium;
    wherein said magnetic recording medium is constructed according to a method comprising the step of sputter-depositing a magnetic layer containing at least one heavy rare gas at a total heavy rare gas concentration greater than 100 ppm on an electrically-conductive substrate, each of said at least one heavy rare gas having a greater atomic weight than that of Ar.

15. A method of manufacturing a magnetic recording medium according to claim 14, wherein the electrically-conductive substrate is electrically biased with a DC bias during the sputter-depositing step.

16. A method of manufacturing a magnetic recording medium according to claim 15, wherein the bias is a negative DC bias voltage between −30 V and −400 V.

17. A method of manufacturing a magnetic recording medium according to claim 14, wherein the electrically-conductive substrate is biased with an RF bias during the sputter-depositing step.

18. A magnetic transducing system according to claim 14, wherein the at least one heavy rare gas is of a single element selected from the group consisting of Kr, Xe and Rn.

19. A magnetic transducing system according to claim 14, wherein the at least one heavy rare gas includes at least two elements selected from the group consisting of Kr, Xe and Rn.

20. A magnetic transducing system according to claim 14, wherein the magnetic layer has a product of remanent magnetization and magnetic layer thickness within a range of 10 G·μm to 150 G·μm.

21. A magnetic transducing system according to claim 14, wherein the magnetic layer has a coercivity between 1600 Oe and 4000 Oe.

22. A magnetic transducing system according to claim 14, wherein the magnetic layer includes Ar atoms.

23. A magnetic transducing system according to claim 14, wherein the electrically-conductive substrate has a nonmagnetic underlayer thereon.

24. A magnetic transducing system according to claim 14, wherein the sputter-depositing step is performed a plurality of times to form a plurality of said magnetic layers, said magnetic recording medium further comprising a nonmagnetic intermediate layer between each successive pair of magnetic layers.

25. A magnetic transducing system according to claim 24, wherein the sputter-depositing step is performed while biasing the electrically-conductive substrate during formation of the plurality of said magnetic layers, but not during the formation of the nonmagnetic intermediate layers.

26. A magnetic transducing system according to claim 14, wherein the electrically-conductive substrate is a nonconductive substrate having an electrically-conductive precoat layer formed thereon.

27. A magnetic transducing system according to claim 14, further comprising an electrically-conductive precoat layer on said electrically-conductive substrate.

* * * * *